United States Patent
Terazono et al.

(10) Patent No.: US 7,651,453 B2
(45) Date of Patent: Jan. 26, 2010

(54) AUTOMATIC CHUCK JAW CHANGE SYSTEM IN COMBINED MACHINING LATHE

(75) Inventors: Shinya Terazono, Aichi pref. (JP);
Fumiya Mizutani, Aichi pref. (JP)

(73) Assignee: Yamazaki Mazak Corporation, Aichi. Pref. (JP)

( * ) Notice: Subject to any disclaimer, the term of this patent is extended or adjusted under 35 U.S.C. 154(b) by 0 days.

(21) Appl. No.: 12/323,603

(22) Filed: Nov. 26, 2008

(65) Prior Publication Data
US 2009/0143206 A1 Jun. 4, 2009

(30) Foreign Application Priority Data
Nov. 29, 2007 (JP) ............... 2007-308581

(51) Int. Cl.
*B23Q 3/155* (2006.01)
*B23B 31/39* (2006.01)
*B23P 23/00* (2006.01)

(52) U.S. Cl. ............... 483/20; 483/18; 483/13; 483/901; 279/901; 29/27 C

(58) Field of Classification Search ............... 483/20, 483/18, 19, 17, 13, 901; 279/900, 901; 29/27 C, 29/27 R
See application file for complete search history.

(56) References Cited

U.S. PATENT DOCUMENTS 4,313,252 A * 2/1982 Kuska et al. ............... 483/20
4,644,636 A * 2/1987 Link et al. ............... 483/20
4,875,275 A * 10/1989 Hutchinson et al. ......... 483/901
5,289,622 A * 3/1994 Minagawa ............... 29/27 R

FOREIGN PATENT DOCUMENTS

| EP | 0 218 756 | 4/1987 |
|---|---|---|
| JP | 61-071905 | 4/1986 |
| JP | 61-090810 | 5/1986 |
| JP | 61-103746 | 5/1986 |
| JP | 61-125752 | 6/1986 |
| JP | 62-044363 | 2/1987 |
| JP | 06-143014 | 5/1994 |
| JP | 06-190616 | 7/1994 |

OTHER PUBLICATIONS

Machine Translation of JP-6-190616, which JP '616 was published in Jul. 1994.*
European Search Report for corresponding Application No. 08405280.2 dated Mar. 11, 2009.

* cited by examiner

*Primary Examiner*—Erica E Cadugan
(74) *Attorney, Agent, or Firm*—Renner, Otto, Boisselle & Sklar, LLP

(57) ABSTRACT

In an automatic chuck jaw change system, a combined machining lathe capable of positioning with high precision and a robot with lower positioning precision than the combined machining lathe cooperate to automatically change a chuck jaw. The system includes a robot disposed in front of the combined machining lathe, and the robot can be selectively mounted on a front end of an arm thereof with a work hand for operating a work, a chuck jaw, and a nut runner hand for operating a drive mechanism of the chuck. The robot cooperates with a tool for jaw mounted on a tool spindle of the combined machining lathe to automatically change a chuck jaw of a main spindle.

7 Claims, 9 Drawing Sheets

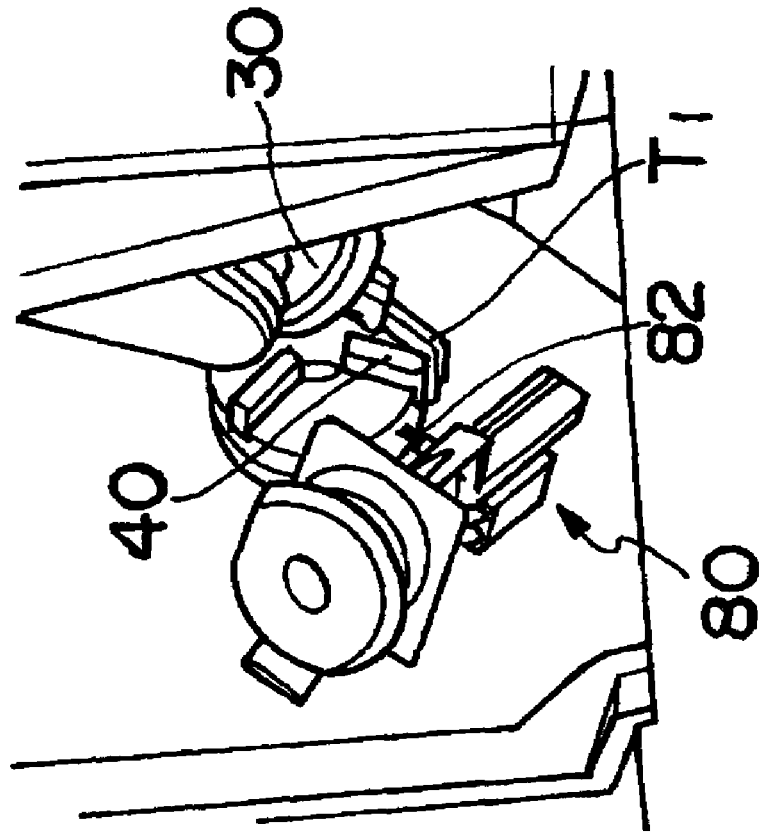
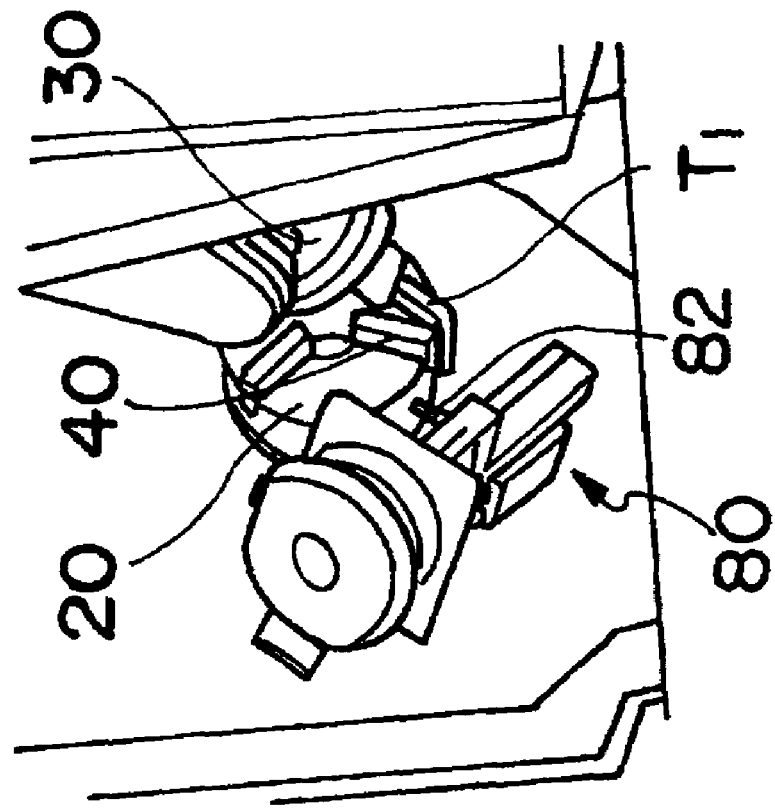
Fig.9(a)
Fig.9(b)

AUTOMATIC CHUCK JAW CHANGE SYSTEM IN COMBINED MACHINING LATHE

The present application is based on and claims priority of Japanese patent application No. 2007-308581 filed on Nov. 29, 2007, the entire contents of which are hereby incorporated by reference.

BACKGROUND OF THE INVENTION

1. Field of the Invention

The present invention relates to an automatic chuck jaw change system in a combined machining lathe.

2. Description of the Related Art

A combined machining lathe, capable of machining various types of works, requires a chuck jaw compatible with the shape and structure of each of the works.

The following patent documents disclose a system or an apparatus for changing a chuck jaw in a combined machining lathe: Japanese Patent Application Laid-Open No. 6-190616, Japanese Patent Application Laid-Open No. 6-143014 and Japanese Patent Application Laid-Open No. 61-103746.

For unattended automatic operation of a combined machining lathe over a long time, the combined machining lathe needs to be equipped with a robot for carrying a work in/out of the combined machining lathe.

A robot for carrying a work in/out has lower positioning accuracy of an arm front end than mechanical positioning accuracy of each device of a combined machining lathe.

SUMMARY OF THE INVENTION

It is therefore an object of the present invention to provide a system in which a tool spindle of a combined machining lathe and a robot cooperate to change a chuck jaw of a main spindle.

In view of the above circumstances, a system according to the present invention includes, as basic means, a combined machining lathe including a main spindle, having a chuck for gripping a work, and a tool spindle which moves along a Z-axis parallel to the axis of the main spindle, an X-axis orthogonal to the axis of the main spindle and a Y-axis perpendicular to a plane formed by the Z-axis and the X-axis and rotates around a B-axis as a rotational axis perpendicular to the plane formed by the Z-axis and the X-axis; and a robot disposed in front of the combined machining lathe, wherein the robot has a nut runner hand and a jaw hand selectively mounted on the front end of an arm thereof, and the combined machining lathe and the robot cooperate to automatically change a jaw of the chuck.

Moreover, the nut runner hand may have a nut runner for operating a cam bolt engaging and disengaging a chuck jaw drive mechanism and the jaw, and the jaw hand may have a gripper for gripping the jaw.

The tool spindle may be selectively provided with a jaw tool for operating the chuck jaw and an air blow tool for air blowing, in addition to various types of machining tools.

The jaw tool may come into point contact with the jaw.

The chuck may be rotated to a position at which a chuck groove is directed in the horizontal direction, in removing the jaw from the chuck of the main spindle.

The automatic chuck jaw change system may further include a process of air-blow to clean a chuck groove from which the jaw is removed and the removed jaw.

The automatic chuck jaw change system may further include a jaw stocker provided in an operating area of the robot.

In an automatic chuck jaw change system of the present invention, a chuck and a tool spindle of a combined machining lathe capable of high accuracy indexing and positioning and a robot can cooperate to automatically change a chuck jaw of a main spindle. During tool change, cleaning of a removed jaw and a chuck groove can also be automatically performed.

BRIEF DESCRIPTION OF THE DRAWINGS

FIG. 9 is an illustrative diagram of a process of automatic change of chuck jaws.

DESCRIPTION OF THE PREFERRED EMBODIMENT

Figure 1:
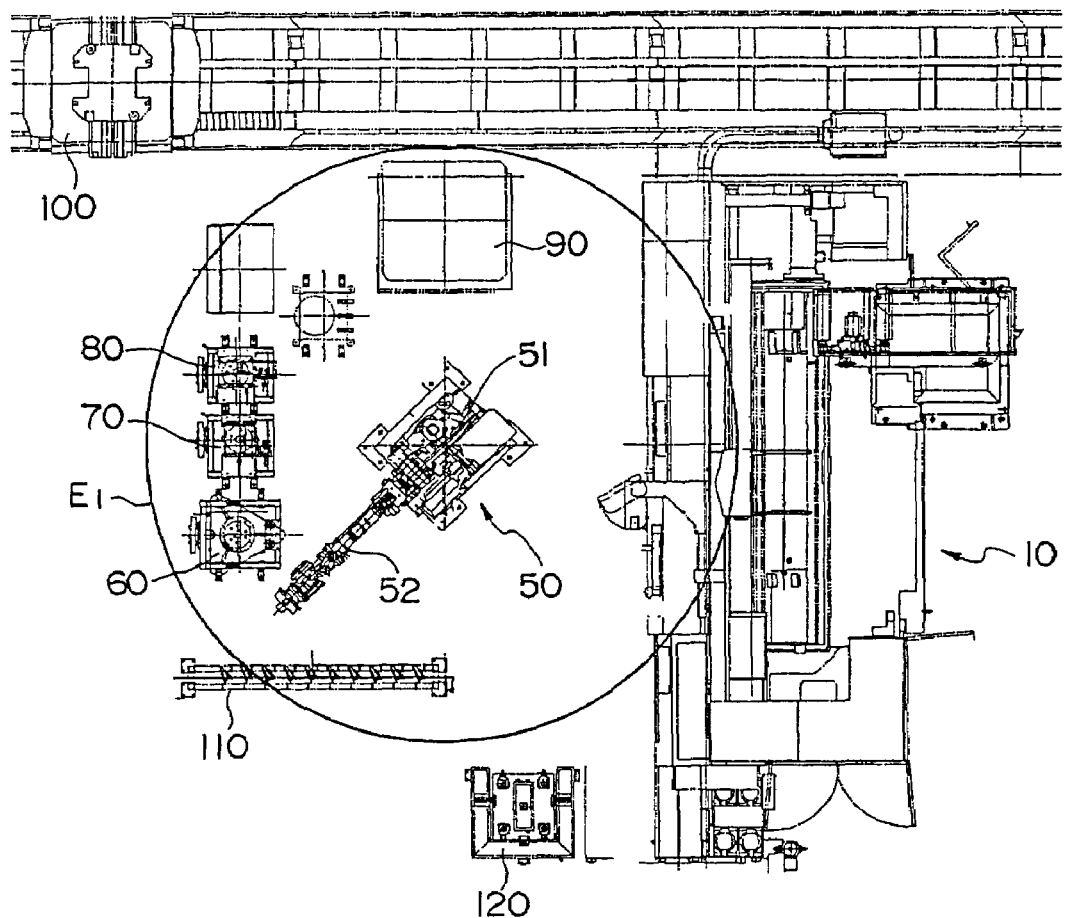
FIG. 1 is a top view illustrating the whole configuration of a system according to the present invention.

FIG. 1 is a top view illustrating the whole configuration of an automatic chuck jaw change system in a combined machining lathe according to an embodiment of the present invention.

This system includes a robot 50 having an articulated structure provided in front of a combined machining lathe 10.

The robot 50 includes a main body 51 and an arm 52 extending from the main body 51. On the front end of the arm 52, there are selectively attached a work hand 60 for gripping a work, a jaw hand 70 for gripping a chuck jaw and a nut runner hand 80 for unlocking a chuck mounted on a main spindle of the combined machining lathe 10. The respective hands are placed on the respective stands.

On the side of the combined machining lathe 10, a work supply station 90 and a pallet conveying apparatus 100 conveying a pallet are provided.

A shelf-like jaw stocker 110 is also placed.

The robot 50 operates within an area shown by a reference symbol $E_1$ in FIG. 1 and an operation panel 120 for an operator is placed outside the area $E_1$.

Figure 2:
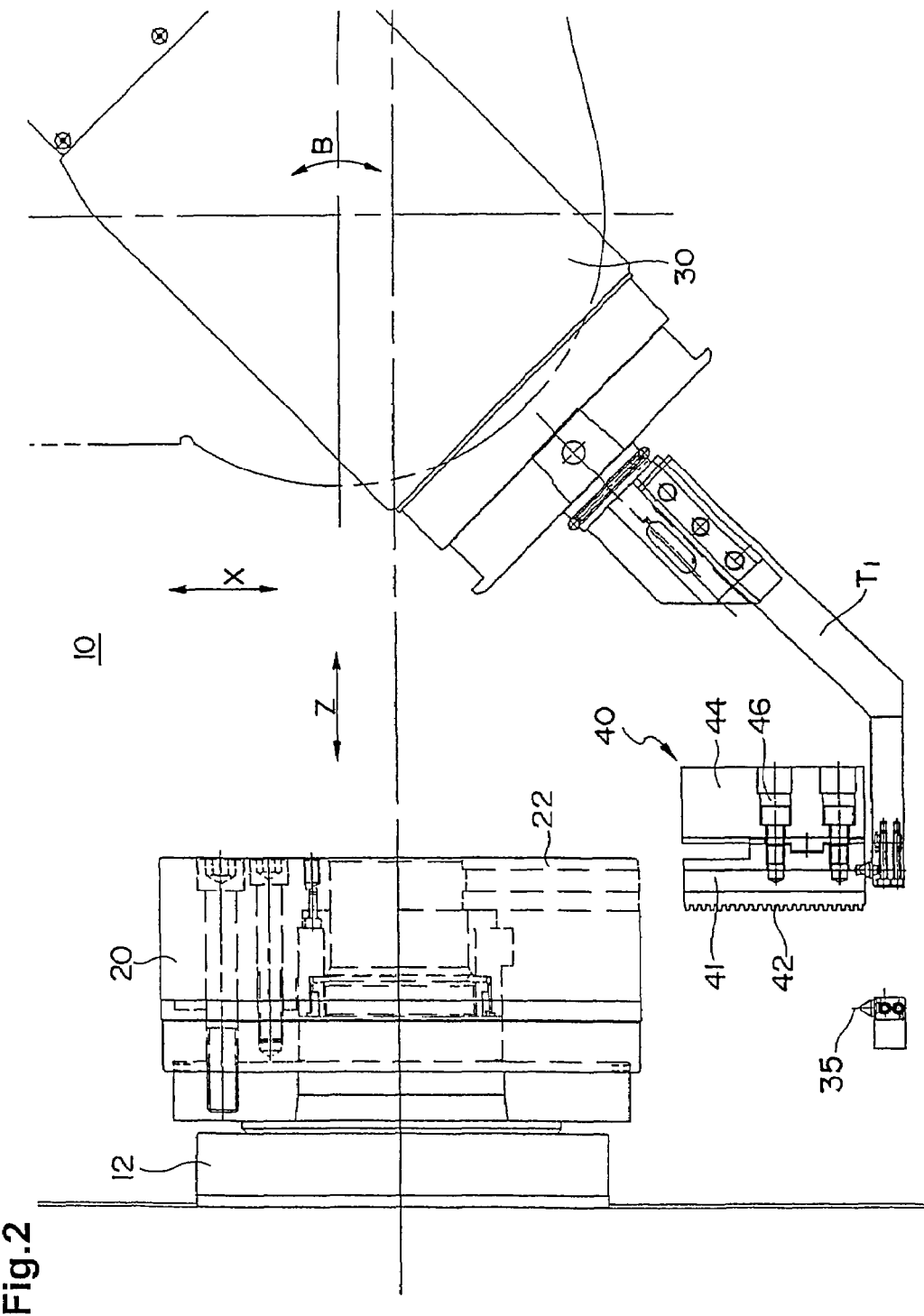
FIG. 2 is an illustrative diagram of a principal part of a combined machining lathe.
Figure 3:
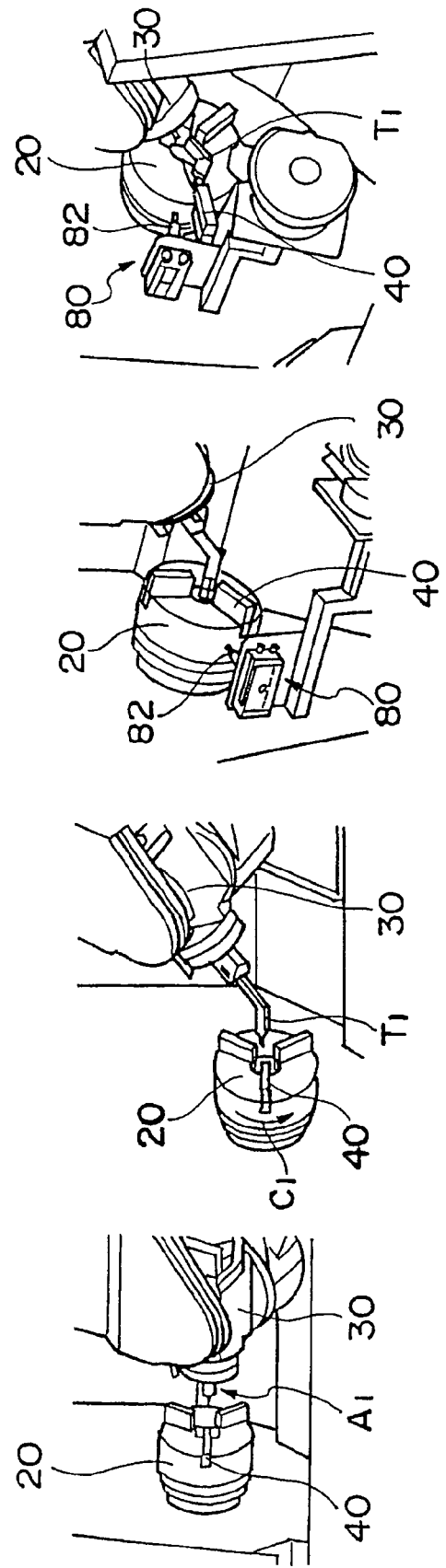
FIG. 3 is an illustrative diagram of a process of automatic change of chuck jaws.

FIG. 2 is an illustrative diagram of a principal part of the combined machining lathe 10.

A main spindle 12 of the combined machining lathe 10 is attached with a chuck 20. The chuck 20, having three jaws, is a so-called "three-jaw chuck". A jaw 40 is provided for each of the three chuck grooves 22. Each of the jaws 40 includes a soft jaw 44 and a master jaw 41 to which the soft jaw 44 is secured by a bolt 46. The master jaw 41 has a rack 42 engaging with a drive mechanism of the chuck 20.

A tool $T_1$ for jaws is processed so that a portion 35 in contact with the jaw 40 is formed into a spherical shape.

A tool spindle 30 disposed at a position opposed to the main spindle 12 moves in Z-axis direction parallel to the axial line of the main spindle 12 and in the X-axis direction orthogonal to the Z-axis. The tool spindle 30 can also move along Y-axis (not shown) perpendicular to a plane formed by X-axis and Z-axis.

Further, the tool spindle 30 can rotate around B-axis that is a rotational axis parallel to Y-axis.

The tool spindle 30 can be replaceably mounted with various types of tools supplied from the automatic tool change system. The tool $T_1$ for jaw automatically changes the jaw 40 for the chuck 20 in cooperation with a robot, which will be described below.

FIGS. 3 to 9 illustrate a series of processes of automatic change of a chuck jaw.

FIG. 3(a) illustrates a process of cleaning a work gripping surface of the chuck jaw 40 with air-blowing tool $A_1$ mounted on the tool spindle 30, prior to chuck jaw change. During this process, the robot is kept in a standby state.

FIG. 3(b) illustrates that the main spindle attached with the chuck 20 is rotated in the $C_1$ direction around a rotational axis so that the jaw 40 to be changed comes in a horizontal position.

The tool mounted on the tool spindle 30 is changed with the tool $T_1$ for jaw. The robot is kept in standby state.

FIG. 3(c) illustrates a process of inserting a nut runner 82 into a cam bolt of the chuck 20 and rotating the cam bolt by 180 degrees with the nut runner hand 80 attached to the front end of the robot arm. By this operation, a rack of the jaw 40 is released from the drive mechanism of the chuck 20.

FIG. 3(d) illustrates a process in which the nut runner hand 80 keeps the position and the tool spindle 30 moves in the horizontal direction so that the tool $T_1$ for jaw pushes the jaw 40 out to a predetermined external position.

As illustrated in FIG. 2, the portion 35 of the tool $T_1$ for jaw is in point contact with the jaw 40 so that generation of twisting in pushing a jaw 40 out is inhibited.

Figure 4:
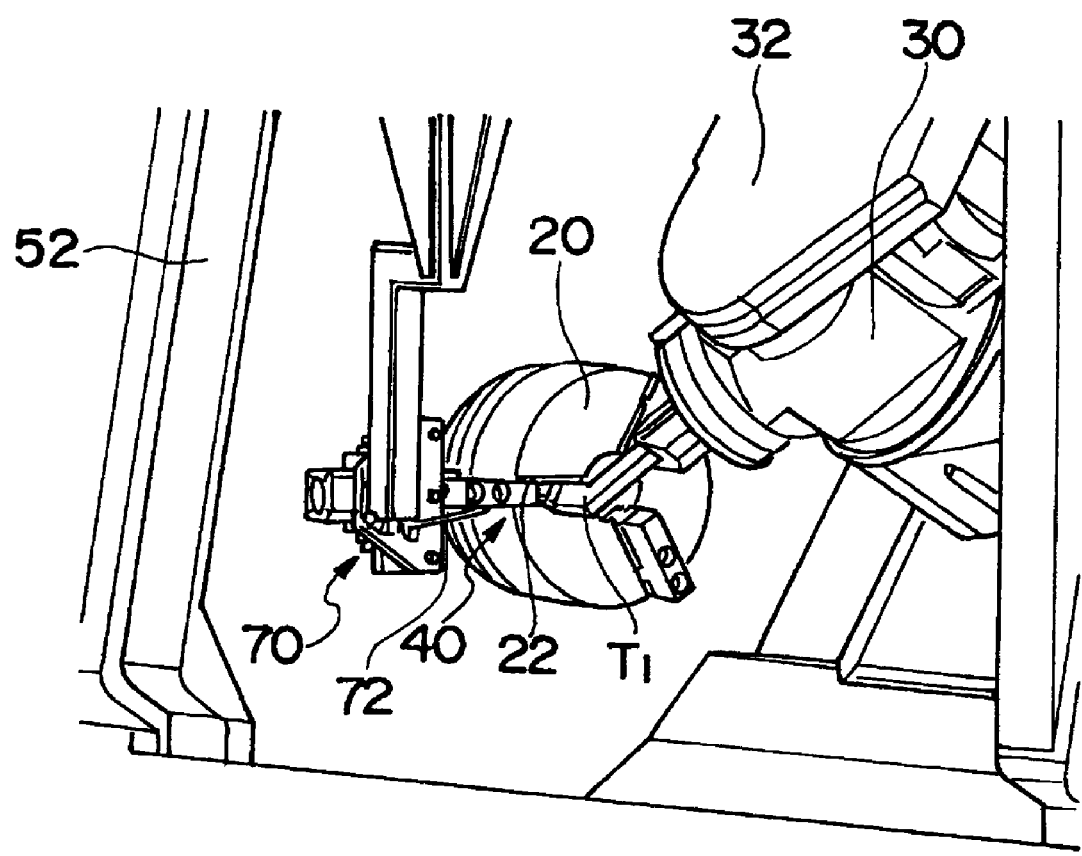
FIG. 4 is an illustrative diagram of a process of automatic change of chuck jaws.

FIG. 4 illustrates a process of taking the jaw 40 out in cooperation of the tool spindle 30 and the robot.

The robot changes the hand on the arm front end from the nut runner hand 80 to the jaw hand 70, grips the jaw 40 with a gripper 72 of the jaw hand 70 and removes the jaw 40 from the chuck 20 in cooperation with the tool $T_1$ for jaw of the tool spindle 30.

The rotation angle of the chuck 20 and movement of the tool spindle mounted with the tool $T_1$ for jaw are controlled with high precision by a NC device of the combined machining lathes, thus the jaw 40 is securely removed from the chuck groove 22 of the chuck 20.

Figure 5:
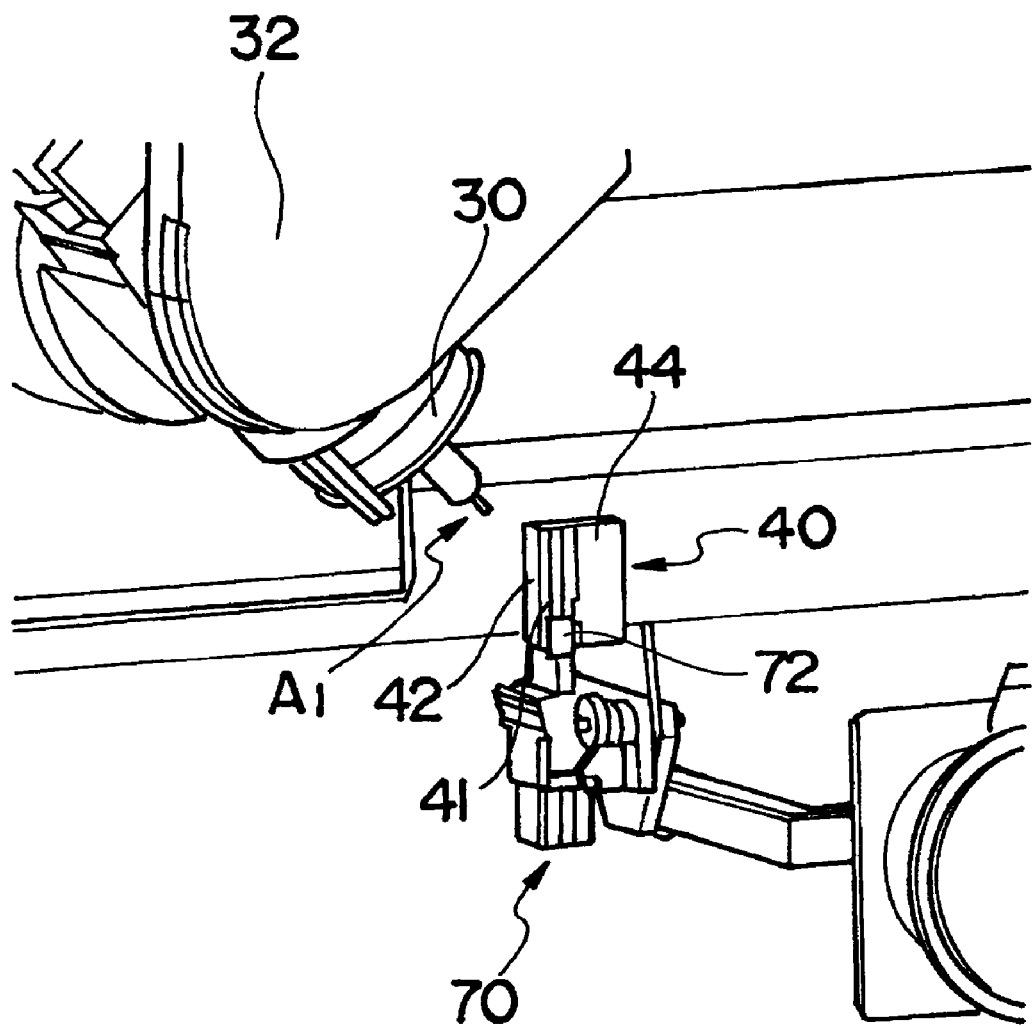
FIG. 5 is an illustrative diagram of a process of automatic change of chuck jaws.

FIG. 5 illustrates a process of rotating a robot hand to direct the jaw 40 gripped by the gripper 72 of the jaw hand 70 upward and cleaning the jaw 40 with the air-blowing tool $A_1$ mounted onto the tool spindle 30.

Cutting chips attaching to the jaw 40 are completely cleaned so as not to be left on the rack 42 and the jaw 40 is returned to the jaw stocker 110.

Figure 6:
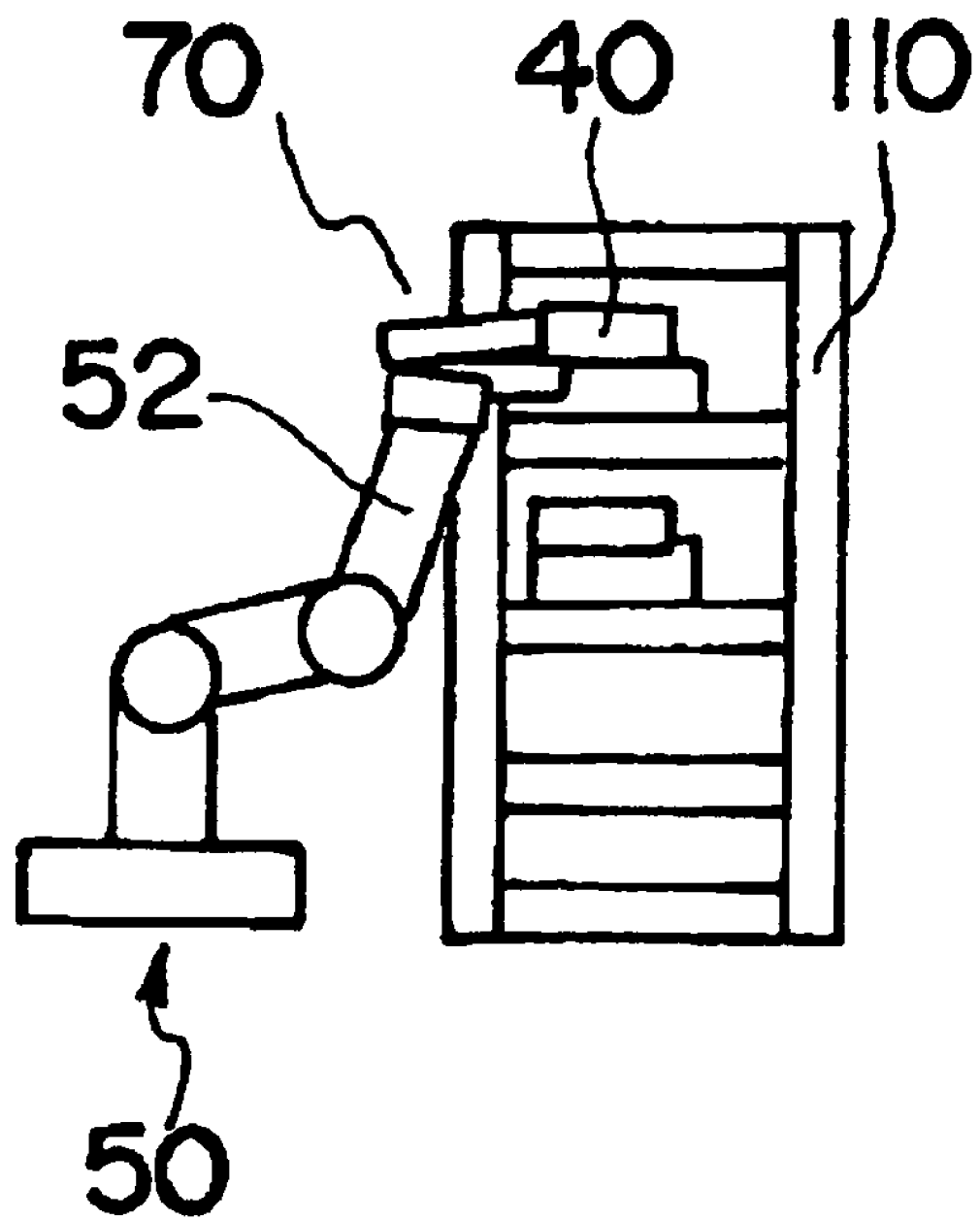
FIG. 6 is an illustrative diagram of a process of automatic change of chuck jaws.

FIG. 6 illustrates a process of returning the jaw 40 to the jaw stocker 110 with the jaw hand 70 by rotating the arm 52 of the robot 50.

Figure 7:
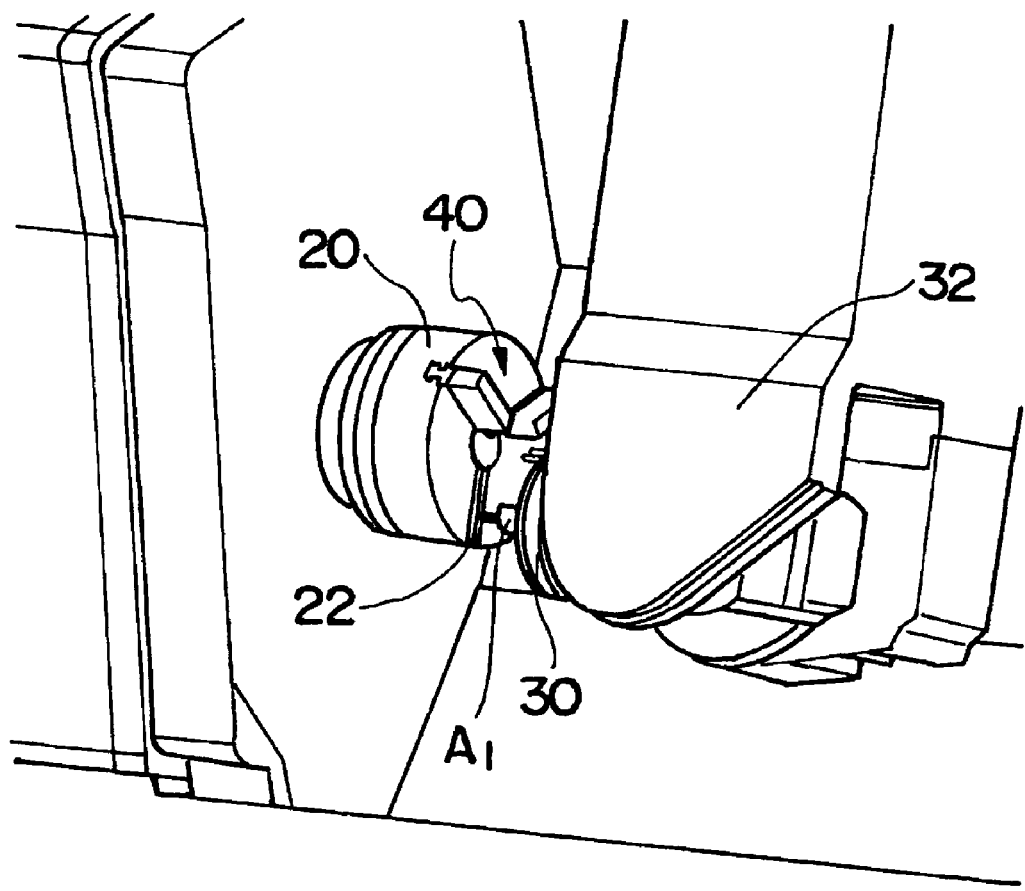
FIG. 7 is an illustrative diagram of a process of automatic change of chuck jaws.

FIG. 7 illustrates a process of cleaning the chuck groove 22 with the air-blowing tool $A_1$ of the tool spindle 30.

At this time, it is preferable to rotate the chuck 20 so that the chuck groove 22 of the chuck 20 is directed downward from the center of the chuck 20.

Figure 8D:
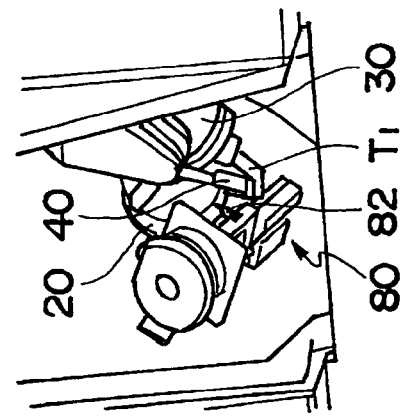
FIG. 8 is an illustrative diagram of a process of automatic change of chuck jaws.
Figure 8C:
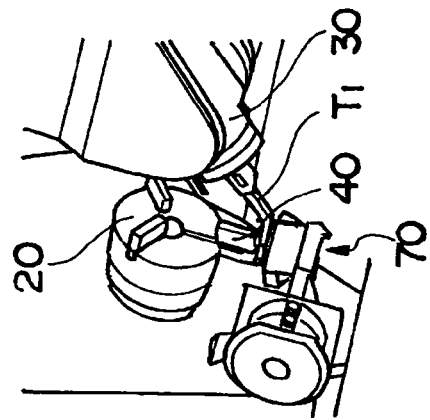
Figure 8B:
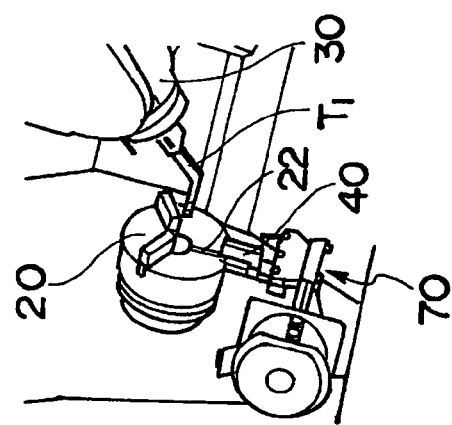
Figure 8A:
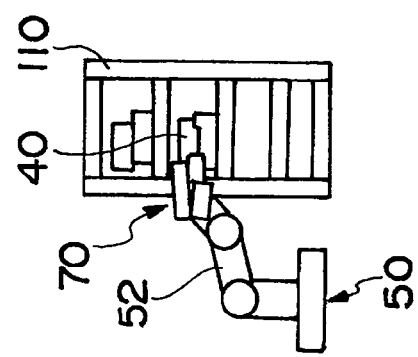

FIG. 8(a) illustrates a process of taking a new jaw 40 from the jaw stocker 110 with the jaw hand 70 mounted on the arm 52 of the robot 50.

FIG. 8(b) illustrates a process of inserting the new jaw 40 into the chuck groove 22 of the chuck 20 with the jaw hand 70. The insertion amount is, for example, 20 mm. This operation is performed solely by the jaw hand 70 and the tool $T_1$ for jaw of the tool spindle 30 is made on standby.

FIG. 8(c) illustrates a process of receiving the jaw 40 inserted by the jaw hand 70 with a tool for jaw of the tool spindle 30.

FIG. 8(d) illustrates a process of replacing the hand of the robot arm front end with the nut runner hand 80, engaging the nut runner 82 with the cam bolt of the chuck 20 and rotating the cam bolt by 180 degrees.

FIG. 9(a) illustrates a process in which the nut runner 82 of the nut runner hand 80 keeps the rotational position and the tool $T_1$ for jaw of the tool spindle 30 inserts the jaw 40 up to a predetermined position of the chuck groove of the chuck 20.

The portion 35 of the tool $T_1$ for jaw is in a point contact with the jaw 40 so that generation of twisting in inserting the jaw 40 is inhibited.

FIG. 9(b) illustrates a process of rotating the nut runner 82 of the nut runner hand 80 in the opposite direction by 180 degrees in a state in which the jaw 40 is inserted by the tool for jaw of the tool spindle 30.

This operation allows the rack of the jaw 40 to engage with the drive mechanism of the chuck 20.

A series of processes described above are repeated to automatically change three jaws 40 of the chuck 20.

What is claimed is:

1. An automatic chuck jaw change system in a combined machining lathe, comprising:
   a combined machining lathe including a main spindle rotatable about an axis, having a chuck for gripping a work, and a tool spindle, to which a machining tool and a jaw tool for operating a jaw of the chuck are selectively mounted, which tool spindle moves along a Z-axis parallel to the axis of the main spindle, an X-axis orthogonal to the axis of the main spindle and a Y-axis perpendicular to a plane formed by the Z-axis and the X-axis and rotates around a B-axis as a rotational axis perpendicular to the plane formed by the Z-axis and the X-axis; and
   a robot disposed in front of the combined machining lathe, wherein
   the robot has a nut runner hand for aiding in an exchange of the jaw and a jaw hand selectively mounted on the front end of an arm thereof, and
   the jaw tool and the robot cooperate to engage and automatically change the jaw of the chuck.

2. The automatic chuck jaw change system in a combined machining lathe according to claim 1, wherein
   the nut runner hand has a nut runner for operating a cam bolt engaging and disengaging a chuck jaw drive mechanism and the jaw, and
   the jaw hand has a gripper for gripping the jaw.

3. The automatic chuck jaw change system in a combined machining lathe according to claim 1, wherein
   the tool spindle is further selectively mounted with an air blow tool for air blowing, in addition to various types of machining tools.

4. The automatic chuck jaw change system in a combined machining lathe according to claim 3, wherein the air blow tool is operable to perform a process of air-blow to clean a chuck groove from which the jaw is removed and to clean the removed jaw.

5. The automatic chuck jaw change system in a combined machining lathe according to claim 1, wherein
   the jaw tool has a point portion coming into contact with the jaw.

6. The automatic chuck jaw change system in a combined machining lathe according to claim 1, wherein
   the combined machining lathe is configured so that the chuck is rotated to a position at which a chuck groove is directed in the horizontal direction, in removing the jaw from the chuck of the main spindle.

7. The automatic chuck jaw change system in a combined machining lathe according to claim 1, further comprising a jaw stocker provided in an operating area of the robot.

* * * * *